United States Patent
Paelian et al.

[15] 3,706,349
[45] Dec. 19, 1972

[54] LOAD CELL

[72] Inventors: Owen Paelian; Donald R. Rister; Richard L. Kellar, all of Huntsville, Ala.

[73] Assignee: Toroid Corporation, Huntsville, Ala.

[22] Filed: Oct. 2, 1970

[21] Appl. No.: 77,634

[52] U.S. Cl. ............................... 177/211, 73/141 A
[51] Int. Cl. ................................................. G01g 3/14
[58] Field of Search ..177/210, 211; 73/141 A, 141 R

[56] References Cited

UNITED STATES PATENTS

| 2,848,892 | 8/1958 | Hoffman | 73/141 A |
| 3,272,006 | 9/1966 | Eckard | 73/141 A |
| R26,302 | 11/1967 | Seed et al. | 73/141 A |
| 2,666,262 | 1/1954 | Ruge | 177/211 X |
| 3,213,400 | 10/1965 | Gieb | 73/141 A |
| 3,335,381 | 8/1967 | Giovanni | 73/141 A |
| 3,365,689 | 1/1968 | Kutsay | 73/141 A |

FOREIGN PATENTS OR APPLICATIONS

| 922,982 | 4/1963 | Great Britain | 73/141 A |
| 1,502,596 | 10/1967 | France | 73/141 A |
| 1,421,107 | 11/1965 | France | 73/141 A |
| 967,243 | 8/1964 | Great Britain | 73/141 A |
| 208,997 | 7/1968 | U.S.S.R. | 73/141 A |

*Primary Examiner*—Robert S. Ward, Jr.
*Attorney*—C. A. Phillips

[57] ABSTRACT

A load cell consisting basically of three structural regions concentrically arranged, a central or hub region adapted to receive loading from a first direction, an outer tubular region adapted to receive opposite and equal loading and a web or diaphragm region interconnecting the central and outer regions, and wherein strain gauges are placed on the surface of the web region and respond to bending strain produced in the web region by load so applied.

11 Claims, 11 Drawing Figures

PATENTED DEC 19 1972

3,706,349

Owen Paelian
Donald R. Rister
Richard L. Kellar,
INVENTORS

BY
C. J. Phillips
ATTORNEY

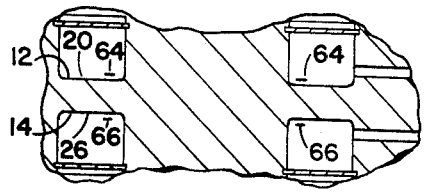
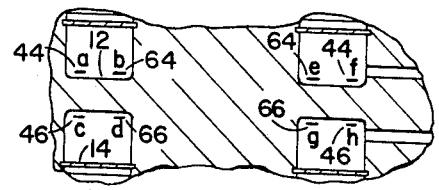
FIG. 4       FIG. 5
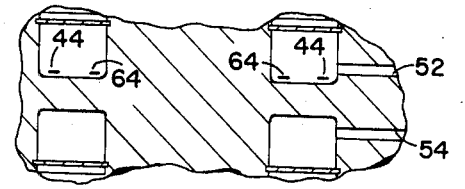
FIG. 6
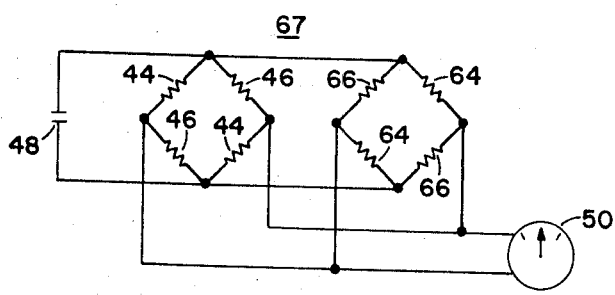
FIG. 11
Owen Paelian
Donald R. Rister
Richard L. Kellar,
INVENTORS.

Owen Paelian
Donald R. Rister
Richard L. Kellar,
INVENTORS.

Owen Paelian
Donald R. Rister
Richard L. Kellar,
INVENTORS

LOAD CELL

This invention relates to weighing devices and particularly to the class of devices commonly referred to as load cells wherein a structural member of the weighing device is caused to deflect or experience strain under load and this strain is detected by means of one or more strain sensitive electrical circuit elements, normally referred to as strain gauges. Typically, two or four strain gauges are connected in an electrical bridge circuit with electrical indicating means to directly readout weight.

Various configurations of load structures have been devised in the past to accomplish electrical weighing by sensing the strain manifested by some form of beam. In one such load cell holes are drilled completely through and normal to the face of a beam and strain gauges placed on wall surfaces of the holes. A second approach, which is used in certain currently available load cells is to drill a hole or holes into one end, or a supported edge, of a beam, the holes extending a distance into the beam beyond a point of support of the beam. The strain gauges are then positioned on wall surfaces of one or more of the holes.

In the first type load cell mentioned above the holes are drilled parallel to the axis of the cell, that is along a line in which loading forces are applied, and drilled at the point of best shear distribution. For example, where the beam is a diaphragm or web suspended between outer and inner circular supports the holes are drilled at spaced points on a circular line on the web. In both prior art systems the deformation or strain sensed is a shear strain. The difficulty with the prior art systems is that of gauge placement. The fact that they are mounted within a hole in itself makes placement difficult. Added to this is the fact that placement critically effects sensitivity and accuracy. In any event "shear" cells of the type described have been more non-linear than can be tolerated in many applications.

It is an object of the present invention to eliminate the disadvantages of previously known load cells and to provide a load cell which is less critical in construction and yet provides greater output and a more linear output than previously obtainable.

These and other objects, features and advantages of the invention will become more apparent from the following description when considered together with the drawings in which:

FIGS. 4-10 are cross-sectional fragmentary views of modifications of the load cell shown in FIG. 1; and FIG. 11 is an electrical schematic diagram of a dual bridge readout system.

Figure 1:
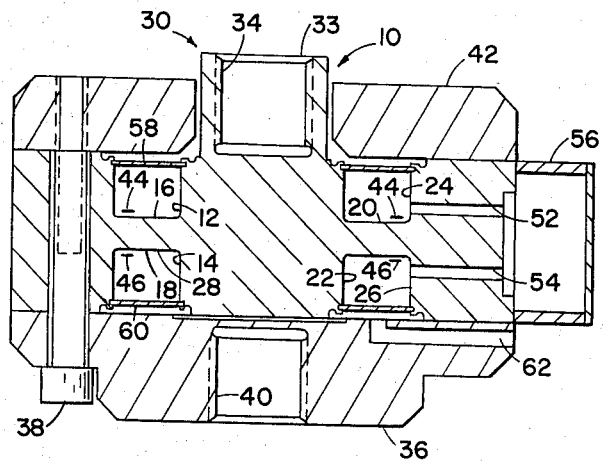
FIG. 1 is a cross-sectional view of a load cell constructed in accordance with this invention.

Referring first to FIG. 1, the basic structure of load cell 10 is formed or machined from a solid block of metal having a desired stress/strain characteristic, such as 17-4PH Steel, 4340 or other high alloy carbon steel, and/or aluminum alloy. Two annular slots or grooves 12 and 14 are cut on opposite sides of load cell 10 from a short cylindrical block of material. Annular slots 12 and 14 have substantially flat bottom surface portions 16 and 18, with inner radius 20 in top groove 12 and inner radius 22 in bottom groove 14, and outer radius 24 and 26 in upper and lower grooves 12 and 14, respectively. Web or diaphragm 28 is formed by virtue of grooves 12 and 14 and the resulting overall configuration can be described as consisting of a central cylindrical region or hub 30, an outer tubular region 32 and web 28 which joins together the central and outer regions.

Top loading of load cell 10 is applied through upper base or base region 33, which as shown in FIG. 1 is an extension of the central cylindrical region 30, and load coupling to it from an external load, not shown, is accomplished by means of a threaded cavity 34. Load cell 10 is supported on the opposite or bottom end by supporting base 36 which is securely bolted to outer tubular region 32 by a plurality of bolts 38. Supporting base 36 is connected to any desired external supporting structure by means of threaded cavity 40. Bolts 38 actually thread into a protective cap 42, outer cylindrical region 32 being thus clamped between lower supporting base 36 and protective cap 42.

Figure 3:
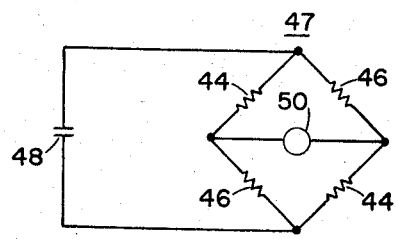
FIG. 3 is an electrical schematic diagram of an electrical bridge circuit for providing a readout of weight sensed by a load cell.

The strain detected by load cell 10, and in all configurations of the present invention, is that of a bending strain on web 28 instead, as in the case of the above referenced prior art, of a shear strain. Thus with a load applied between upper base 33 and lower supporting base 36, web 28 will bend. This bending strain is sensed by one or more strain gauges 44 positioned on substantially flat upper surface region 16 of web 28 near the outer radius 24 of groove 12, and one or more strain gauges 46 are positioned on the opposite bottom surface 18 of web 28 adjacent outer radius 26 of groove 14. Gauges 44 and 46 are oppositely effected with gauges 44 going into tension and gauges 46 going into compression when a compressive force is applied between upper base 33 and lower supporting base 36. Strain gauges 44 and 46 are of the electrical resistance type, which decrease in resistance when compressed and increase in resistance when placed in tension. Thus an ideal electrical bridge configuration is made possible as shown in FIG. 3, which illustrates broadly an electrical bridge circuit 47 in which pairs of strain gauges 44 and 46 are connected oppositely as shown. The bridge is powered by power source 48 and weight read out on an appropriately calibrated readout, such as calibrated galvanometer 50.

Channels 52 and 54 (FIG. 1) provide wiring access to strain gauges 44 and 46 and are terminated in an electrical junction box 56 from which wires would be run to the balance of the electrical circuitry of a system, as shown, for example, in FIG. 3. The circuit of FIG. 3 is broadly illustrative of a load cell readout system which may include in addition, various circuit balancing and compensating elements, depending upon the complexity of the system and accuracy required. Sealing plates 58 and 60 provide a protective environmental covering for grooves 12 and 14 and strain gauges 44 and 46 permitting a sealed system and diaphragms continuously connecting central cylindrical region 30 and outer tubular region 32.

Where load cells are constructed for relatively low ranges of measurement and an unbalance in relative pressures occurring across sealing plates 58 and 60 may cause errors in measurement, channel 62 is employed to provide atmospheric access to the lower side of sealing plate 60 and the environment of the seal. This thus balances the atmospheric pressure normally applied to the top of sealing plate 58 which is open to the atmosphere by virtue of the spacing between protective cap 42 and upper base region 33.

The load cell of FIG. 4 differs from that of FIG. 1 only in that strain gauges 64 are placed adjacent inner radius 20 in upper groove 12, and strain gauges 66 are positioned adjacent inner radius 26 of lower groove 14.

Figure 2:
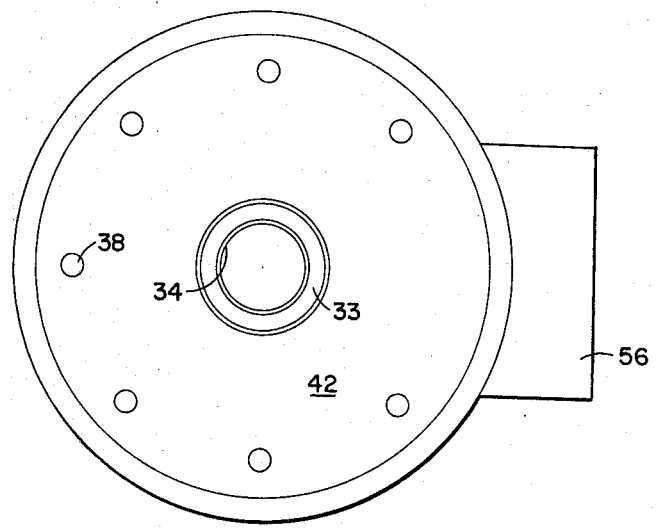
FIG. 2 is a top plan view of the load cell shown in FIG. 1.

FIG. 5 shows another embodiment of the invention, it differing from the embodiment shown in FIGS. 1 and 2 in that it employs strain gauges on both the inner and outer radiused edges of grooves 12 and 14. Thus we have eight strain gauges, two each of strain gauges 44, 46, 64 and 66. They would be connected as shown in FIG. 11 to form a measurement circuit 67 consisting of two parallel bridge circuits and would provide an extremely accurate output. It is to be noted that a compressive force applied between upper base region 33 and lower base region 36, as shown by the arrows F in FIG. 5, would reduce the resistance of strain gauges 44 and 66.

FIG. 6 shows still another embodiment of the invention, it differing from those of FIGS. 1-3 in that strain gauges 44 and 64 are positioned in top groove 12 only. The electrical bridge configuration is shown in FIG. 3.

Figure 7:
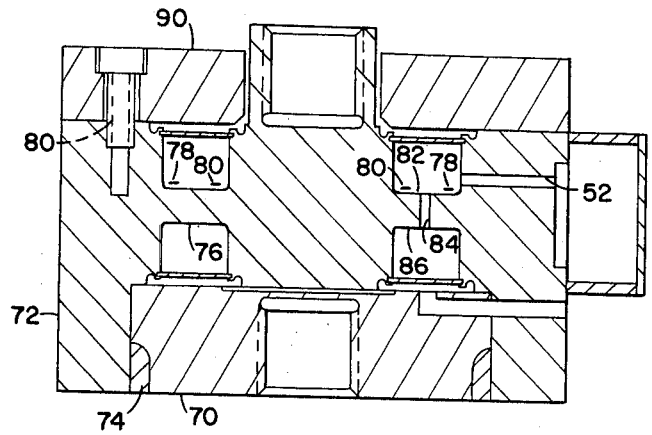

FIG. 7 shows still another embodiment of the invention and in it supporting base 70 is positioned within the lower portion of outer tubular region 72 and a circular weld 74 secures outer tubular region 72 to supporting base 70, and being a lateral weld serves to prevent the expansion outward, under load, of outer tubular region 72, which is necessary to provide linearity of bending of web region 76. As shown in FIG. 7, gauges 78 and 80 are positioned in top groove 82 only but may be positioned in accordance with any of the other schemes illustrated in FIGS. 1, 4, 5 and 6. With gauges only in top groove 82, channel 54 (FIG. 6) may be eliminated and instead a passageway 84 between grooves 82 and 86 serves to equalize pressure between grooves 82 and 86. If desired, channel 84 may also be used to wire between gauges in grooves 82 and 86 in instances where gauges are mounted in both grooves. Bolts 88 connect top protective cap 90 to outer tubular region 72.

Figure 8:
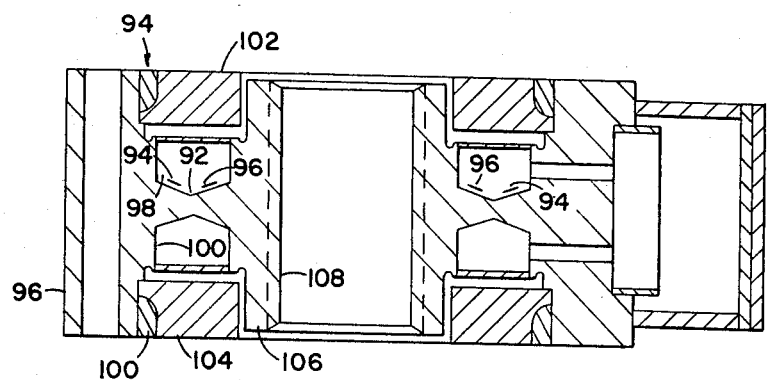

FIG. 8 illustrates still another embodiment of the invention in which web 92 varies in thickness, being V-shaped. It is a particular feature of load cell 94 that outer cylindrical region 96 is welded at welds 98 and 100 at top and bottom to both upper and lower base members 102 and 104, which are identical, and thus load cell 94 is symmetrical and may be supported at the top or bottom by central cylindrical region 106.

This embodiment of the invention also provides an extremely low profile in that loading may be coupled to the load cell at either end of central cylindrical region 106, which is tubular having a hollow center 108 which is threaded for coupling to external sources of load. Welding of outer cylindrical region 96 to both upper and lower bases 102 and 104 very effectively prevents lateral expansion of outer tubular region 96 under load and enables very linear strain on web 92 to achieve very linear electrical output from strain gauges 106 and 108 which are positioned on opposite flat surfaces of groove 92.

The V-shaped annular groove also distributes the stress such as to approach uniform stress conditions and thereby cause gauge placement to be less severe. Further, the V-shaped annular groove effectively reduces stress concentrations at the radiused junction with inner hub region and at the radiused junction with outer cylindrical region, thus effectively increasing life under reversed stress conditions.

Figure 9:
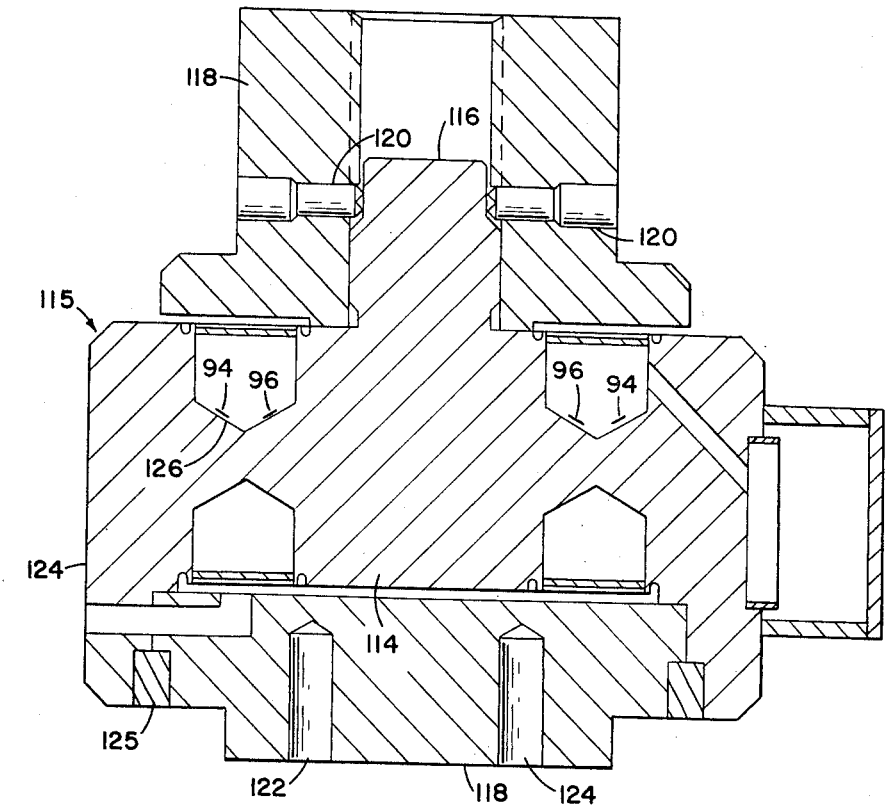

FIG. 9 shows still another embodiment of the invention and in which hub 114 of load cell 115 includes an upper extension 116 to which adapter 118 connects by locking bolts 120. Adapter 118 provides means for coupling an external load to load cell 115. Lower base 121 may be secured to an external support by bolts threaded into bolt holes 122. Base 121 is again welded to outer tubular member 124 by weld 125 to prevent lateral expansion of the latter under load. As shown, strain gauges 106 and 108 are positioned in top groove 126 in a manner described with respect to FIG. 8. Alternate arrangements for gauge placement have been illustrated in FIGS. 1, 4 and 5.

Figure 10:
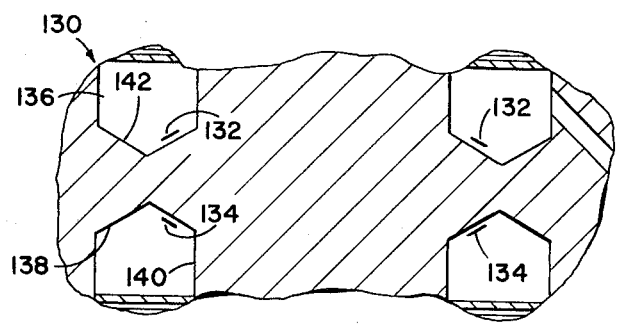

Load cell 130 shown in FIG. 10 differs from load cell 115 of FIG. 9 in that strain gauges 132 and 134 are placed only on the flat surfaces of the inner opposite sides of V grooves 136 and 138.

The foregoing specification describes substantial improvements in load cell construction wherein greater accuracy, longer life and greater flexibility in use may be achieved.

What is claimed is:
1. An electrical weighing apparatus comprising:
A. a first base member adapted to receive and couple an external load to said weighing apparatus in a first direction;
B. a second base member adapted to receive and couple an external load to said weighing apparatus in a second and opposite direction to that of said first external load;
C. a strain producing assembly comprising:
  1. a central cylindrical region adapted to receive a load applied concentrically therewith from said first base member,
  2. an outer tubular region surrounding said central cylindrical region and adapted to receive a load applied concentrically therewith from said second base member, and
  3. a web region interconnecting said outer and central regions, the opposite surfaces of said web regions forming with said central cylindrical region and said tubular region a pair of oppositely positioned, substantially identical, annular slots;
D. a plurality of strain gauges uniformly spaced on a bottom surface of said web region;
E. a first diaphragm connecting continuously between said outer and central regions between walls of one of said annular slots, and a second diaphragm connecting continuously between said outer and central regions between walls of the other of said annular slots.

2. An electrical weighing apparatus as set forth in claim 1 wherein said first base member and said central cylindrical region comprise an integral structure and include means for attachment of said first base member to an external structure.

3. An electrical weighing apparatus as set forth in claim 1 further comprising connecting means connecting said second base member and said outer tubular region for restraining expansion transverse of said outer tubular region when a load is applied to said weighing apparatus.

4. An electrical weighing apparatus as set forth in claim 3 wherein said connecting means comprises lateral welds, welds connecting transverse to an applied load, between said outer tubular region and said second base member.

5. An electrical weighing apparatus as set forth in claim 3 wherein the bottoms of said annular slots of said web region include at least one substantially flat surface area and said strain gauges are applied to at least one of said substantially flat surface areas.

6. An electrical weighing apparatus as set forth in claim 3 wherein a said slot is of increasing depth toward its annular center, measured radially, and each said strain gauge is attached to a bottom surface area of a said slot which is substantially on one side of said annular center.

7. An electrical weighing apparatus as set forth in claim 5 wherein said strain gauges are placed adjacent to an edge of a said substantially flat surface area.

8. An electrical weighing apparatus as set forth in claim 7 wherein said plurality of strain gauges comprise at least two said strain gauges positioned adjacent an inner said edge and at least two said strain gauges are positioned adjacent an outer said edge.

9. An electrical weighing apparatus as set forth in claim 7 wherein said plurality of strain gauges comprise at least two strain gauges positioned adjacent an outer said edge of each of said slots.

10. An electrical weighing apparatus as set forth in claim 7 wherein said plurality of strain gauges comprise at least two said strain gauges positioned adjacent an inner said edge of each of said slots.

11. An electrical weighing apparatus as set forth in claim 7 wherein said plurality of strain gauges comprises at least two said strain gauges positioned adjacent an outer said edge of each of said slots and at least two said strain gauges positioned adjacent an inner said edge of each of said slots.

* * * * *